(12) United States Patent
Aso et al.

(10) Patent No.: US 8,362,720 B2
(45) Date of Patent: Jan. 29, 2013

(54) LINEAR MOTOR POSITION DETECTION SYSTEM

(75) Inventors: Toshiyuki Aso, Tokyo (JP); Shuhei Yamanaka, Tokyo (JP); Toshiro Tojo, Tokyo (JP)

(73) Assignee: THK Co., Ltd., Tokyo (JP)

( * ) Notice: Subject to any disclaimer, the term of this patent is extended or adjusted under 35 U.S.C. 154(b) by 563 days.

(21) Appl. No.: 12/602,028

(22) PCT Filed: May 30, 2008

(86) PCT No.: PCT/JP2008/060021
§ 371 (c)(1),
(2), (4) Date: Nov. 25, 2009

(87) PCT Pub. No.: WO2008/149805

PCT Pub. Date: Dec. 11, 2008

(65) Prior Publication Data
US 2010/0171459 A1 Jul. 8, 2010

(30) Foreign Application Priority Data

May 31, 2007 (JP) ................................. 2007-145641

(51) Int. Cl.
*H02P 1/00* (2006.01)
(52) U.S. Cl. ........................................ 318/135; 318/602
(58) Field of Classification Search .................. 318/135, 318/602, 603
See application file for complete search history.

(56) References Cited

U.S. PATENT DOCUMENTS

| 4,772,815 | A | * | 9/1988 | Harned et al. | 310/171 |
| 5,153,472 | A | * | 10/1992 | Karidis et al. | 310/13 |
| 5,434,549 | A | * | 7/1995 | Hirabayashi et al. | 335/229 |
| 5,929,631 | A | * | 7/1999 | Striker et al. | 324/207.21 |
| 5,939,804 | A | * | 8/1999 | Nakao et al. | 310/12.14 |
| 6,175,169 | B1 | * | 1/2001 | Hollis et al. | 310/12.05 |
| 6,823,725 | B2 | * | 11/2004 | Lohberg | 73/114.01 |
| 6,954,589 | B2 | * | 10/2005 | Okawara | 396/87 |

(Continued)

FOREIGN PATENT DOCUMENTS

| JP | 6194112 A | 7/1994 |
| JP | 11-206099 A | 7/1999 |

(Continued)

OTHER PUBLICATIONS

International Search Report of PCT/JP2008/060021, mailing date of Aug. 19, 2008.

*Primary Examiner* — Rina Duda
(74) *Attorney, Agent, or Firm* — Westerman, Hattori, Daniels & Adrian, LLP

(57) ABSTRACT

A position detection system includes a linear motor having a rod in which magnetic poles of N pole and S pole are arranged alternately in an axial direction and a plurality of coils surrounding the rod a magnetic sensor for detecting change in the direction of the magnetic field of the rod caused by linear movement of the rod relative to the coils to output a sine wave signal and a cosine wave signal which are 90° phase shifted with respect to one another, and a position detecting circuit for detecting a position of the rod relative to the coils. As the magnetic sensor detects the change in the direction of the magnetic field of the rod, the sine wave signal and the cosine wave signal output from the magnetic sensor hardly vary even when the distance between the rod and the magnetic sensor is changed.

6 Claims, 20 Drawing Sheets

U.S. PATENT DOCUMENTS

| | | | |
|---|---|---|---|
| 7,064,538 B2 * | 6/2006 | Kernhof | 324/207.25 |
| 7,466,125 B2 * | 12/2008 | Heinze et al. | 324/207.25 |
| 7,723,942 B1 * | 5/2010 | Labriola, II | 318/601 |
| 2003/0000307 A1 | 1/2003 | Lohberg | |

FOREIGN PATENT DOCUMENTS

| | | |
|---|---|---|
| JP | 3036274 B2 | 4/2000 |
| JP | 2003-524778 A | 8/2003 |
| JP | 2003-254780 A | 9/2003 |
| JP | 2004-056892 A | 2/2004 |
| JP | 2006-067771 A | 3/2006 |
| JP | 2006-208025 A | 8/2006 |
| JP | 2007-097295 A | 4/2007 |
| WO | 2004/010566 A1 | 1/2004 |
| WO | 2006/011341 A1 | 2/2006 |
| WO | 2007/037298 A1 | 4/2007 |

* cited by examiner

Moving direction of mover

LINEAR MOTOR POSITION DETECTION SYSTEM

TECHNICAL FIELD

The present invention relates to a linear motor position detection system for detecting a position of a linear motor which obtains thrust by current passing through coils and magnetic field of magnets.

BACKGROUND ART

A rod type linear motor as one type of linear motors has a plurality of circular cylindrical coils stacked and a rod inserted into a hole of the stacked coils. The rod has magnetic poles of N poles and S poles arranged therein alternately. When three-phase current having 120-degree different three phases is made to pass through the coils of U, V, W phases and a moving magnetic field is generated moving in the coil axial direction, the rod obtains thrust from the moving magnetic field and moves linearly in synchronization with the speed of the moving magnetic field.

Control of the rod movement needs detection of the position of the rod. Conventionally, there is known, as a sensor for detecting the position of the rod, a magnetic encoder having a magnetic scale and a magnetic sensor (see patent document 1). For example, the magnetic scale having the N poles and S poles arranged alternately is mounted to the side of the coils as stator, and the magnetic sensor for detecting the magnitude of the magnetic field of the magnetic scale is mounted on the side of the rod as mover.

As illustrated in FIG. 33, in the magnetic field 41, a magnetic force line 42 extends from the center of the N pole to the center of the S pole. The magnetic sensor 43 detects the magnitude of the magnetic field generated by the magnetic scale 41. The magnitude of the magnetic field becomes largest as the magnetic sensor gets close to the separation point of the N pole and S pole and becomes smallest as the magnetic sensor gets close to the center of the N pole or S pole. By detecting the magnitude of the magnetic field, it becomes possible to know the position of the magnetic sensor 43 relative to the magnetic scale 41.

[Patent Document 1] Japanese Patent No. 3036274

DISCLOSURE OF THE INVENTION

Problems to be Solved by the Invention

However, in the conventional magnetic encoder, there is a need to control a gap between the magnetic scale and the magnetic sensor with high accuracy. This distance has to be maintained even when the rod is moving. This is because, as illustrated in FIG. 34, when the magnetic sensor 43 is displaced from the position (1) to the position (2), the magnetic field acting on the magnetic sensor 43 becomes small and a sine wave signal output from the magnetic sensor 43 also becomes small from (1) to (2). As the position of the magnetic sensor 43 is obtained by the strength of the sine wave signal output from the magnetic sensor 43, if the sine wave signal output from the magnetic sensor 43 becomes small, it is difficult to detect an accurate position of the magnetic sensor 43.

Such gap control makes the operation of mounting the magnetic scale and the magnetic sensor on the linear motor difficult and causes cost increase. In order to solve this problem, as illustrated in FIG. 35, there is contemplated a method of compensating displacement by providing another magnetic sensor 43 at the opposite side of the magnetic scale 41 and obtaining a difference. However, this method causes an increase in the number of the magnetic sensors 43.

Then, the present invention provides a position detection system which is inexpensive and can eliminate the need to control the accuracy in mounting the sensor strictly.

Means for Solving the Problems

A description on the present invention will now be given below.

In order to solve the above-mentioned problems, a linear motor position detection system includes, a linear motor having one of a mover and a stator in which magnetic poles of N pole and S pole are arranged alternately in an axial direction and an other of the mover and the stator including a plurality of coils and provided for obtaining thrust for linear movement by a magnetic field generated by the one and current passing through the coils of the other; a magnetic sensor having a magneto-resistive element of which a resistance varies depending on a direction of the magnetic field and provided for outputting a sine wave signal and a cosine wave signal which are 90° phase shifted to each other, depending on change in direction of the magnetic field generated by the linear movement of the mover relative to the stator; and a position detecting circuit for detecting a position of the mover relative to the stator based on the sine wave signal and the cosine wave signal.

Further, the above-described linear motor position detection system may include the position detecting circuit comprises an A/D converter for sampling the sine wave signal and the cosine wave signal at predetermined intervals to convert them into digital data, a phase angle data calculating unit for obtaining phase angle data from a sine component and a cosine component of the digital data converted, and a pulse signal outputting unit for generating a pulse signal in accordance with the phase angle data.

Still further, the above-described linear motor position detection system may include that the linear motor is a rod type linear motor, having: in the one of the mover and the stator, a rod having a plurality of magnets each magnetized with the N pole and the S pole at respective ends thereof in the axial direction, the magnets being arranged in the axial direction in such a manner that the N pole of each magnet faces the N pole of an adjacent magnet and the S pole of each magnet faces the S pole of an adjacent magnet and a soft magnetic material being interposed between adjacent ones of the magnets; and in the other of the mover and the stator, the plural coils surrounding the rod.

Additionally, the linear motor position detection system described above includes the linear motor further which may include a coil case for accommodating the plural coils, a magnetic sensor case provided at an end of the coil case in the axial direction and having a magnetic sensor accommodating part for accommodating the magnetic sensor, and a filler for filling the magnetic sensor accommodating part to fix the magnetic sensor to the magnetic sensor accommodating part, and at least one of the magnetic sensor case and the filler has a heat conductivity lower than that of the coil case.

In addition to the above, the linear motor further may include a bearing mounted at an end of the magnetic sensor case in the axial direction for guiding linear movement of the rod.

The linear motor position detection system described above may also include the linear motor which is a flat type linear motor, having: in the one of the mover and the stator, a field magnet having a plurality of magnets each magnetized with the N pole and the S pole at respective end surfaces thereof in a direction perpendicular to the axial direction; and, in the other of the mover and the stator, the plural coils facing the field magnet with a gap formed therebetween.

Effects of the Invention

As noted above, as the magnetic sensor detects change in direction of the magnetic field, the sine wave signal the cosine wave signal output from the magnetic sensor hardly vary even if the distance between the magnetic sensor and the one of the mover and the stator is changed. Hence, it is possible to detect the position of the stator accurately and facilitate the adjustment in mounting of the magnetic sensor. Besides, as the magnetic poles of one of the mover and the stator for generating thrust are also used as the magnetic scale, the magnetic sensor can be realized inexpensive and downsized.

Further, as the position detecting circuit performs interpolation of the sine wave signal and the cosine wave signal output from the magnetic sensor, if the magnetic poles of one of the mover and the stator of which the pitch between the magnetic poles is longer than that of the magnetic encoder are also used as the magnetic scale, the position detection system of higher resolution can be obtained.

Still further, as the soft magnetic material is interposed between the magnets of the rod, the distribution of the magnetic flux density of the rod can be made close to ideal sine wave. Hence, it becomes possible to detect the accurate position of the mover by the magnetic sensor.

Additionally, the heat generating in the coils is hard to propagate to the magnetic sensor. The magnetic sensor has temperature dependence and its output is affected by change in temperature. It becomes possible to prevent the output from the magnetic sensor from being affected by heat of the coils.

Still further, as the bearing guides the rod, it becomes possible to keep the distance between the rod and the magnetic sensor almost constant.

Still further, as the plural magnets magnetized with N pole and S poles at respective end surfaces in the direction perpendicular to the axial direction are arranged in the axial direction, the distribution of the magnetic flux density of the field magnet can be made close to the sine wave. Hence, it becomes possible to detect the accurate position of the mover by the magnetic sensor.

REFERENCE NUMERALS

1 . . . rod, 2 . . . coil case, 3 . . . magnet, 4 . . . coil, 8 . . . bush (bearing), 9 . . . end case (magnetic sensor case), 11 . . . linear motor, 12 . . . magnetic sensor, 13 . . . position detecting circuit, 14 ... driver 21 ... glass substrate, 22 ... magneto-resistive element, 26 ... magnetic sensor holding part, 27 ... filler, 30 ... A/D converter, 32 ... signal processing part (phase angle data calculating unit and pulse signal outputting unit)

MODE FOR CARRYING OUT THE INVENTION

Figure 1:
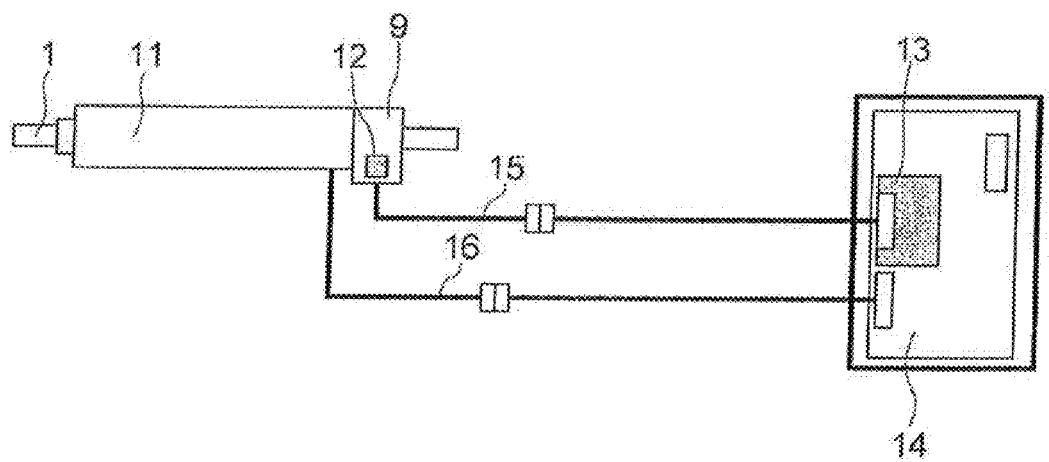
FIG. 1 is a structural view of a position detection system according to an exemplary embodiment of the present invention.

With reference to the attached drawings, exemplary embodiments of the present invention will be described below. FIG. 1 is a linear motor position detection system according to an exemplary embodiment of the present invention. This position detection system has a linear motor 11, a magnetic sensor 12 for detecting the position of a rod 1 of the linear motor 11 and a position detecting circuit 13 for interpolating a signal output from the magnetic sensor 12. A signal of the position output from the position detecting circuit 13 is given to a driver 14 of the linear motor 11. The driver 14 has built therein a power converter such as a PWM (Pulse Width Modulation) inverter for supplying power in a form suitable to control the linear motor 11 and a controller for controlling the power converter by instructions from an upper-level computer or signals from the position detecting circuit 13. The magnetic sensor 12 and the position detecting circuit 13 are connected to each other via an encoder cable 15. The coils of the linear motor 11 and the power converter of the driver are connected via a power cable 16.

Figure 2:
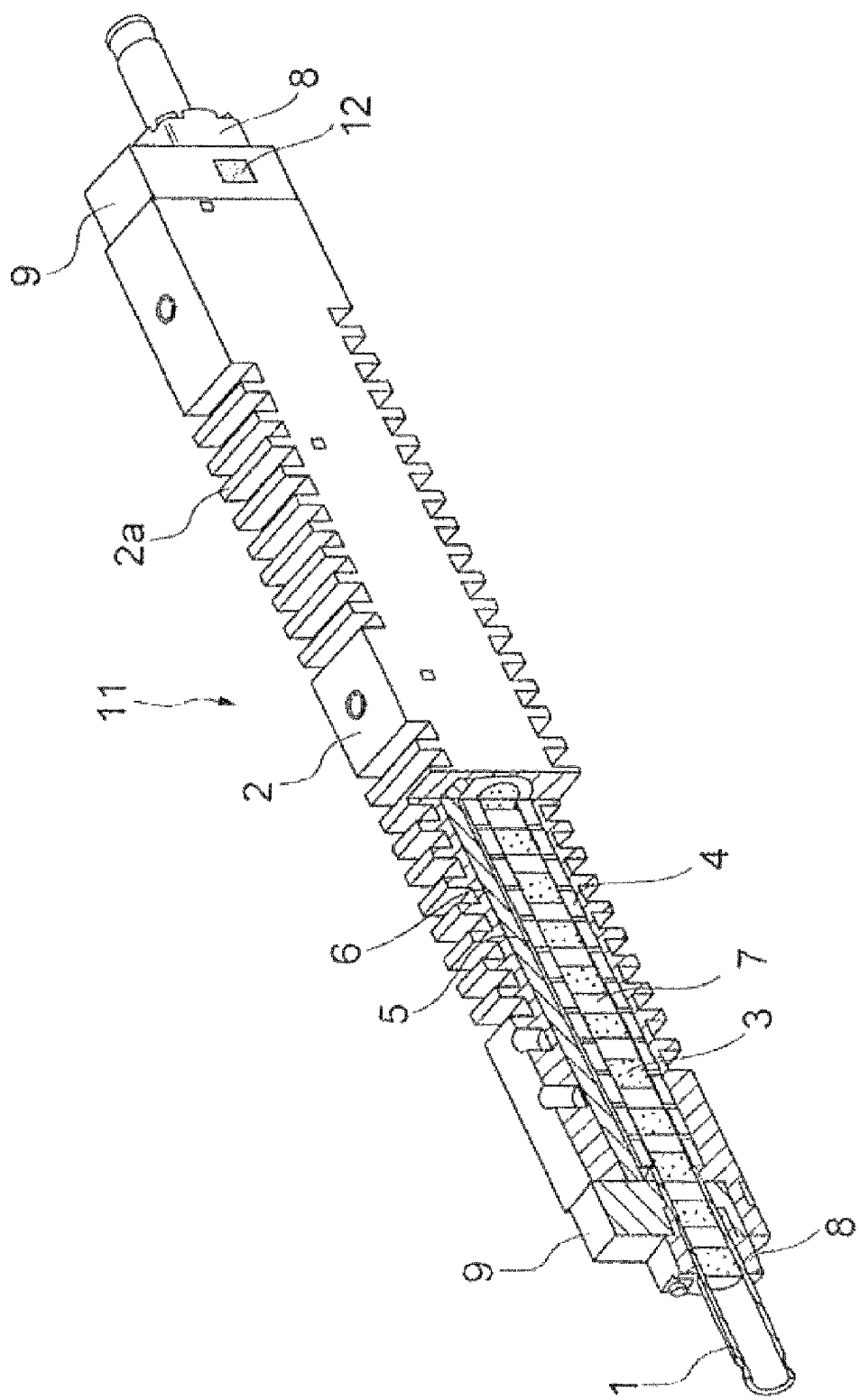
FIG. 2 is a perspective view of a linear motor (including a partial cross sectional view).

FIG. 2 is a perspective view of the linear motor (including a partial cross-sectional view). This linear motor 11 is a rod type linear motor in which a rod 1 moves in an axial direction relative to a coil case 2. This is used, for example, when a chip-shaped electronic part is mounted on the tip end of the rod 1 and the electronic part is mounted on a predetermined position on the substrate. The linear motor 11 may be used in only one axis, or plural linear motors 11 may be arranged to be used as multiple axis actuator to enhance operation efficiency.

In the coil case 2, a plurality of coils 4 is stacked. On each end surface of the coil case 2, an end case 9 is mounted. The end case 9 is provided with a bush 8 as bearing for guiding linear movement of the rod 1.

The rod 1 is made of nonmagnetic material such as stainless and has a hollow space like a pipe. In the hollow space of the rod 1, a plurality of disc-shaped magnets 3 (segment magnets) is stacked in such a manner that the same poles faces each other. That is, the magnets 3 are stacked with the N pole faces the N pole and the S pole faces the S pole. A pole shoe 7 (magnetic pole block) made of soft magnetic material such as iron or the like is arranged between the adjacent magnets 3. As the pole shoe 7 is arranged, the magnetic flux density generated in the rod 1 can be close to sine wave. In order to make the magnetic flux density close to the sine wave and increase the magnetic flux density, the length of the pole shoe 7 in the axial direction is set shorter than the length of the magnets 3 in the axial direction. In this exemplary embodiment, the length of the pole shoe 7 in the axial direction is set to about one half of the length of the magnets 3 in the axial direction. The rod 1 passes through the stacked coils 4 and held in the coil case 2 movable in the axial direction.

Figure 3:
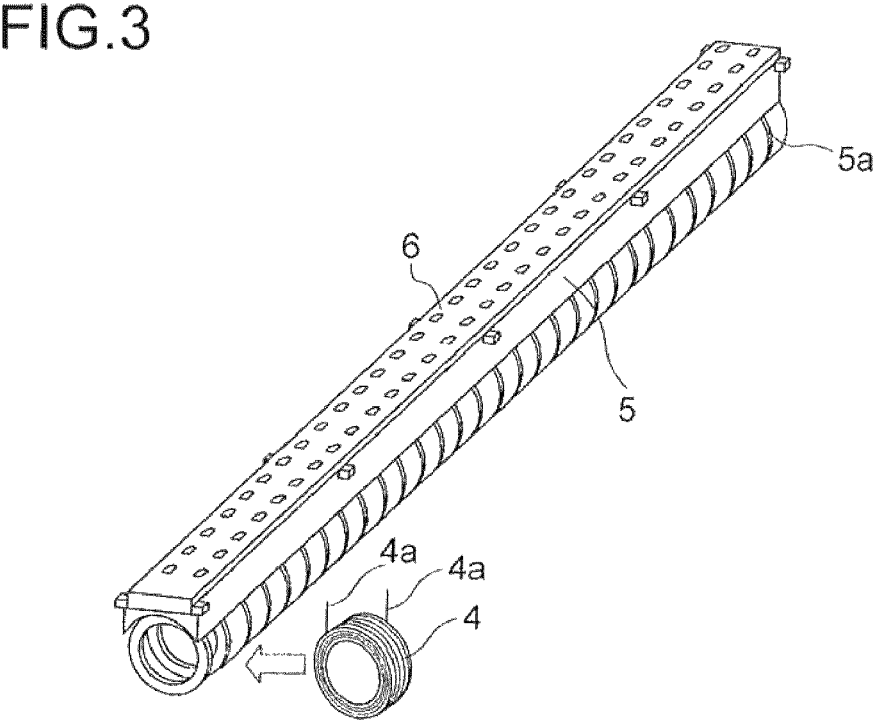
FIG. 3 is a perspective view illustrating a coil unit held in a coil holder.

As illustrated in FIG. 3, the coil 4 is formed by winding a copper wire spirally and held in the coil holder 5. In order to insulate each adjacent coil 4, a ring-shaped resin spacer 5a is arranged between the coils 4. On the coil holder 5, a printed board 6 is provided. End part 4a of coil winding is connected to the printed board 6.

In this exemplary embodiment, the coil case 2 is formed integral with the coils 4 by insert molding of setting the coils 4 and the coil holder 5 in a die and injecting a molten resin or special ceramics into the die. As illustrated in FIG. 2, in the coil case 2, a plurality of fins 2a is formed to enhance heat dissipation capacity of the coils 4. The coils 4 and the coil holder 5 may be fixed to the coil case 2 by holding the coils 4 held by the coil holder 5 in the coil case 2 made of aluminum and filling spaces between the coils 4 and the coil case 2 with an adhesive agent.

Figure 4:
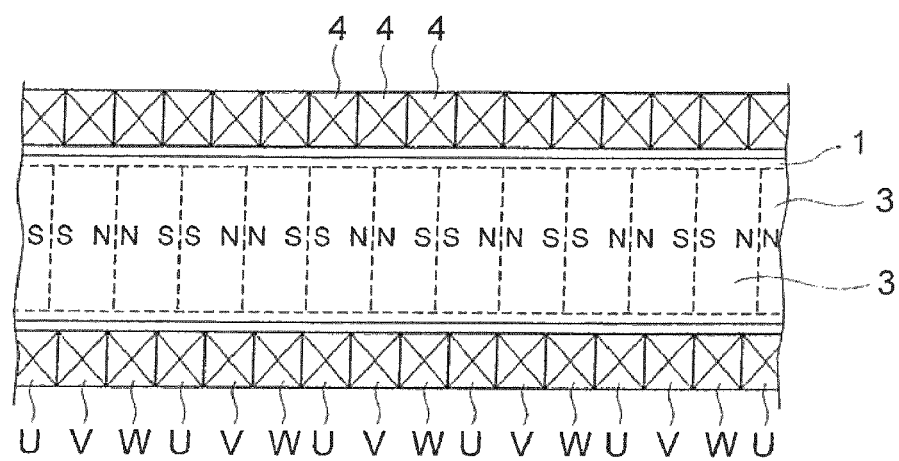
FIG. 4 is a view illustrating a positional relation between the linear motor and the coils.

FIG. 4 illustrates a positional relation between the magnets 3 and the coils 4 of the linear motor. In the hollow space of the rod 1, the disc-shaped plural magnets 3 (segment magnets) are arranged in such a manner that the same poles face each other. Every three of the coils form one coil set of U, V, W phases. A plurality of three-phase coil sets is combined into a coil unit. When three phase current of 120-degree different phases is made to pass through the coils of U, V, W phases, the moving magnetic field is generated moving in the axial direction of the coils 4. The rod 1 obtains thrust by the moving magnetic field and moves linearly relative to the coils 4 in synchronization with the speed of the moving magnetic field.

As illustrated in FIG. 2, on one of the end cases 9 as the magnetic sensor cases, the magnetic sensor 12 is mounted for detecting the position of the rod 1. The magnetic sensor 12 is arranged with a predetermined space away from the rod 1 and detects change in direction of the magnetic field of the rod 1 generated by linear movement of the rod 1 (direction of the magnetic vector).

Figure 5:
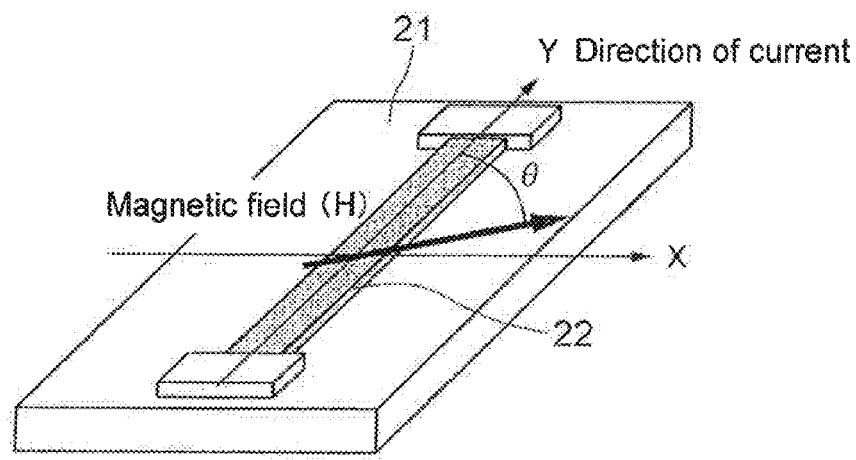
FIG. 5 is a perspective view illustrating the principle of the magnetic sensor.

As illustrated in FIG. 5, the magnetic sensor 12 has a Si or glass substrate 21 and a magneto-resistive element 22 formed thereon and made of a ferromagnetic thin film metal of an alloy that contains ferromagnetic metal such as Ni or Fe in major proportions. The magnetic sensor 12 is an AMR (Anisotropic-Magneto-Resistance) sensor as the resistance varies in a specific magnetic field direction.

Figure 6:
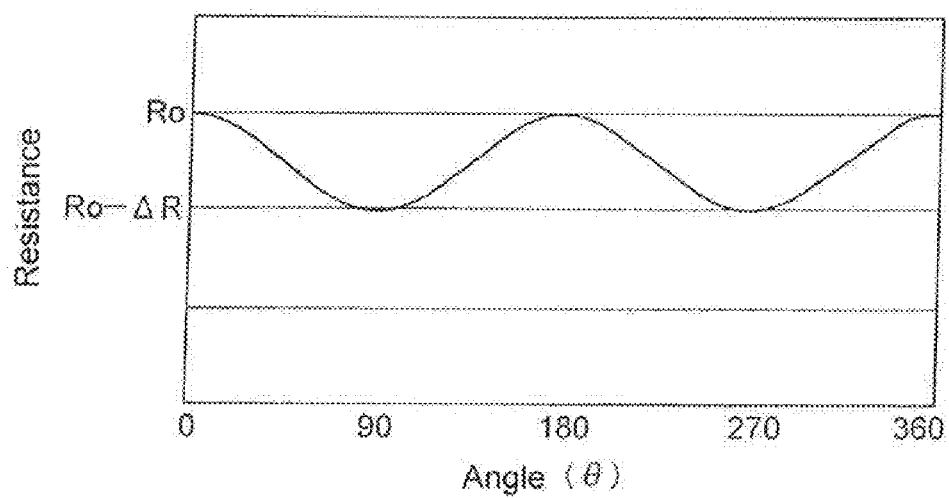
FIG. 6 is a graph illustrating a relation between resistance of the magnetic sensor and the angle θ of the direction of the magnetic field.

It is assumed that as current passes through the magneto-resistive element 22, the magnetic field magnitude, with which the resistance change is saturated, is applied and the angle change θ is given to the magnetic field (H) in the current direction Y. As illustrated in FIG. 6, the resistance change (ΔR) is maximized when the current direction and the magnetic direction are perpendicular to each other (θ=90°, 270°) and minimized when the current direction and the magnetic direction are parallel with each other (θ=0°, 180°). The resistance R varies in accordance with angle components in the current direction the magnetic direction, as expressed in the following equation (1).

(Equation 1)

$$R = R_0 - \Delta R \sin^2 \theta \tag{1}$$

$R_0$: resistance in ferromagnetic thin film metal in a non magnetic field
ΔR: change in resistance
θ: angle of the magnetic field direction When it is the saturation sensitivity region or more, ΔR becomes a constant and the resistance R becomes unaffected by the magnitude of the magnetic field.

Figure 7:
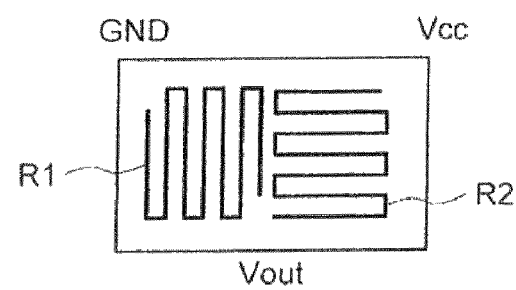
FIG. 7 is a plane view illustrating a ferromagnetic thin film metal of the magnetic sensor.

The shape of the ferromagnetic thin film metal of the magnetic sensor 12 detecting the direction of the magnetic field with the magnetic field magnitude greater than that in the saturation sensitivity range is illustrated in FIG. 7. The shape is such that a ferromagnetic thin film metal element formed longitudinally (R1) and an element formed transversally (R2) are connected in series. The magnitude in the vertical direction that creates the greatest change in resistance of the element (R1) creates the smallest change in resistance of the element (R2). The resistances R1 and R2 are given by the following equations.

(Equation 2)

$$R1 = R_0 - \Delta R \sin^2\theta \quad (2)$$

(Equation 3)

$$R2 = R_0 - \Delta R \cos^2\theta \quad (3)$$

Figure 8:
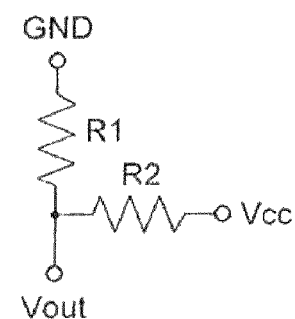
FIG. 8 illustrates an equivalent circuitry of the magnetic sensor of FIG. 7.

An equivalent circuit (half bridge) of this magnetic sensor 12 is illustrated in FIG. 8. The output Vout is given by the following equation.

(Equation 4)

$$V\text{out} = R1 \cdot V\text{cc}/(R1+R2) \quad (4)$$

When the equations (2) and (3) are substituted into the equation (4), the following equation can be obtained.

(Equation 5)

$$V\text{out} = V\text{cc}/2 + \alpha \cos 2\theta \quad (5)$$

$$\alpha = \Delta R \cdot V\text{cc}/2(2R0 - \Delta R)$$

Figure 9:
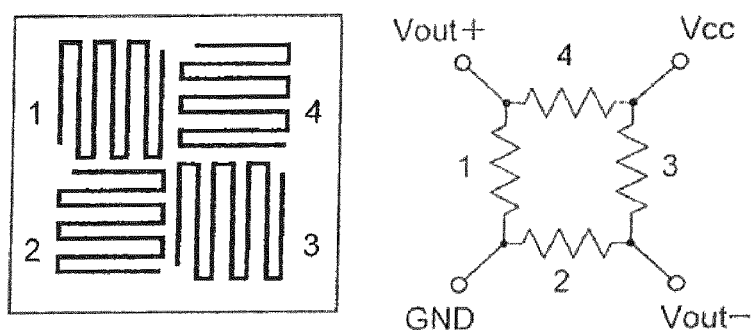
FIG. 9 is a view illustrating the magnetic sensor of Wheatstone bridge structure.
Figure 10:
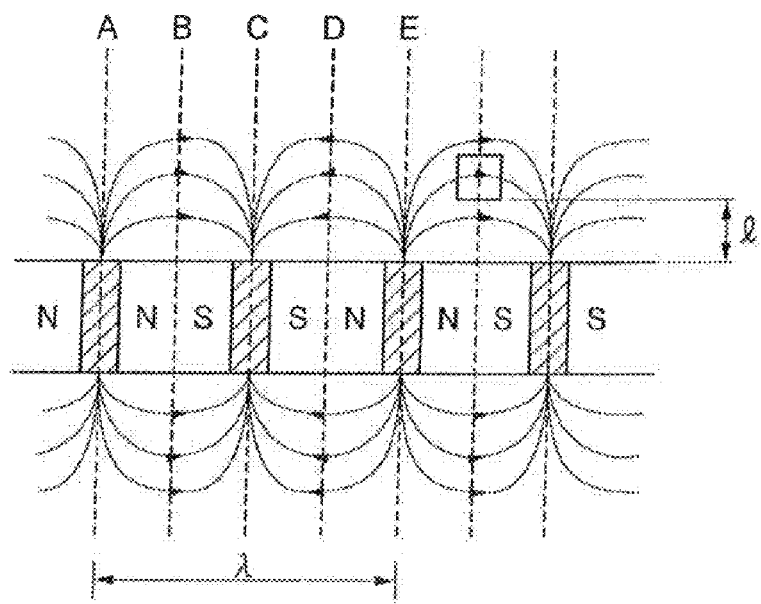
FIG. 10 is a view illustrating a positional relation between the magnetic sensor and the magnetic field generated by the rod.
Figure 11:
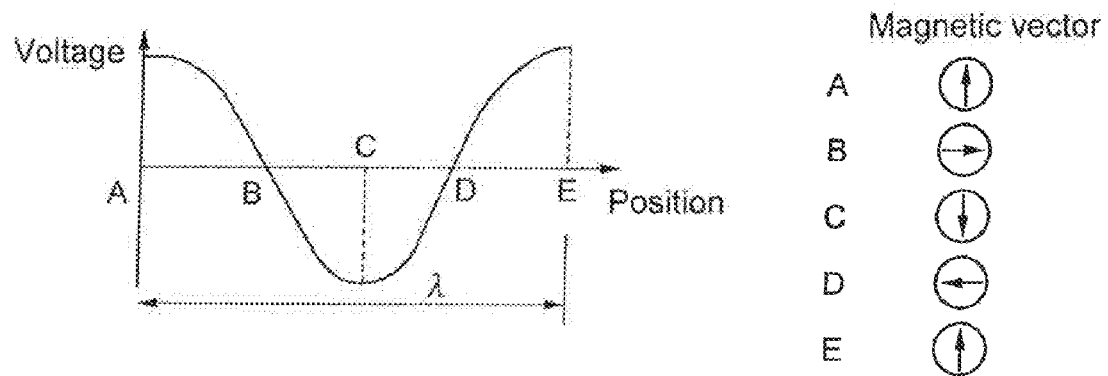
FIG. 11 is a graph illustrating a relation between output voltage and the direction of the magnetic vector detected by the magnetic sensor.

As illustrated in FIG. 9, when the ferromagnetic thin film metal is sharpened, it becomes a well-known Wheatstone bridge structure. When two outputs Vout+ and Vout− are used, it becomes possible to amplify and enhance stability of midpoint potential Here, description is made about change in the magnetic field direction when the rod 1 moves linearly and output of the magnetic sensor 12. As illustrated in FIG. 10, the magnetic sensor 12 is arranged at a position of the gap 1 where the magnetic field magnitude greater than that in the saturation sensitivity range is applied, in such a manner that the directional change of the magnetic field is responsible for the sensor surface. As illustrated in FIG. 11, when the rod 1 moves linearly by the distance λ, the magnetic field direction becomes one rotation in the terms of the sensor. At this time, the voltage signal becomes one cycle sine wave. More accurately, the output profile becomes two-cycle wave profile by the equation (5) Vout=Vcc/2+α cos 2θ. However, when the bias magnetic field is applied 45° relative to the extending direction of the element of the magnetic sensor 12, the cycle is reduced by half and when the rod 1 moves linearly in the distance λ, a one-cycle output profile can be obtained.

Figure 12A:
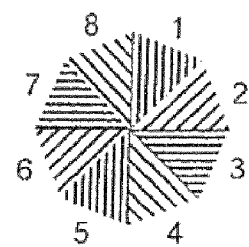
FIGS. 12A and 12B are views illustrating the magnetic sensor of two full bridge structures (FIG. 12A is a plane view illustrating the shape of the ferromagnetic thin film metal of the magnetic sensor and FIG. 12B is an equivalent circuitry).
Figure 12B:
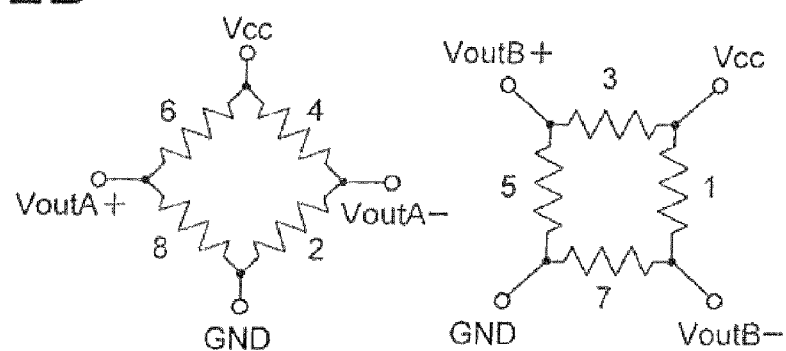
Figure 13:
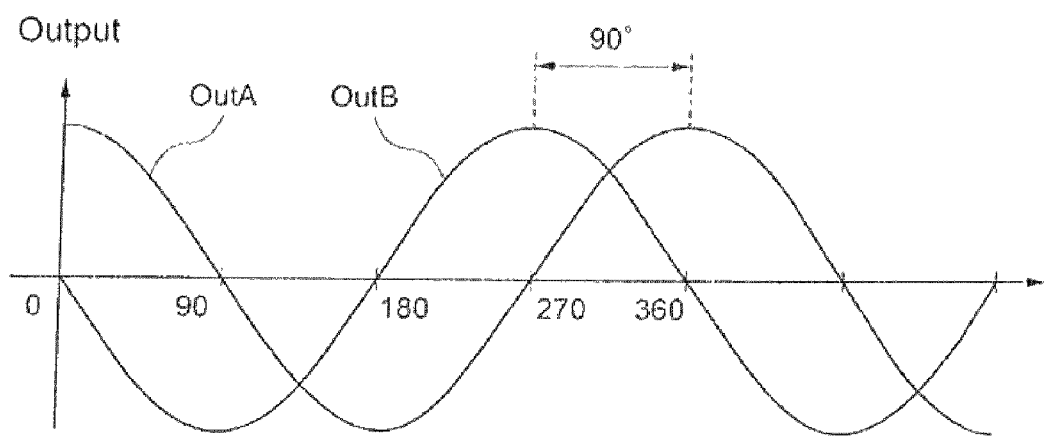
FIG. 13 is a graph illustrating the sine wave signal and the cosine wave signal output from the magnetic sensor.

In order to know the moving direction, as illustrated in FIG. 12, two elements of full bridge structure may be formed on the one substrate in such a manner that they are inclined 45° relative to each other. The outputs Vout A and Vout B obtained by the two full bridge circuits becomes cosine wave and sine wave having 90° phase difference, as illustrated in FIG. 13.

Figure 14:
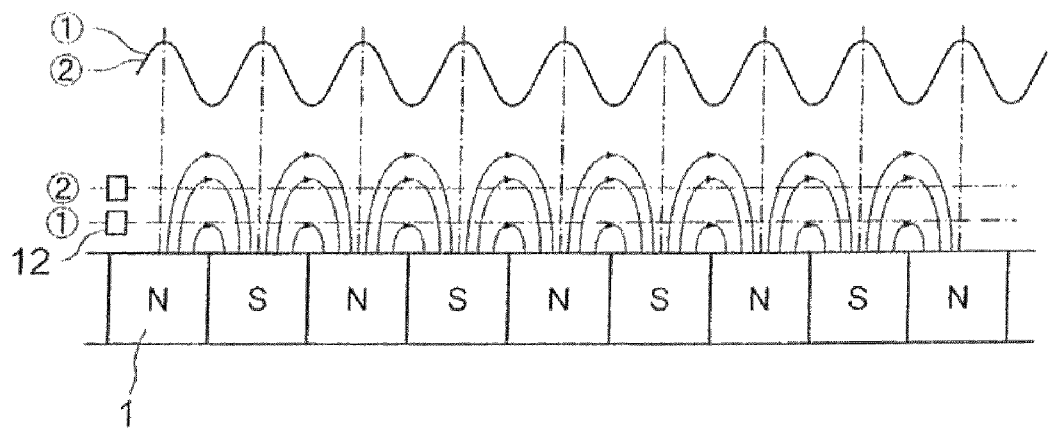
FIG. 14 is a conceptual diagram illustrating an output signal of the magnetic sensor and the positional relation between the magnetic sensor and the rod.
Figure 15:
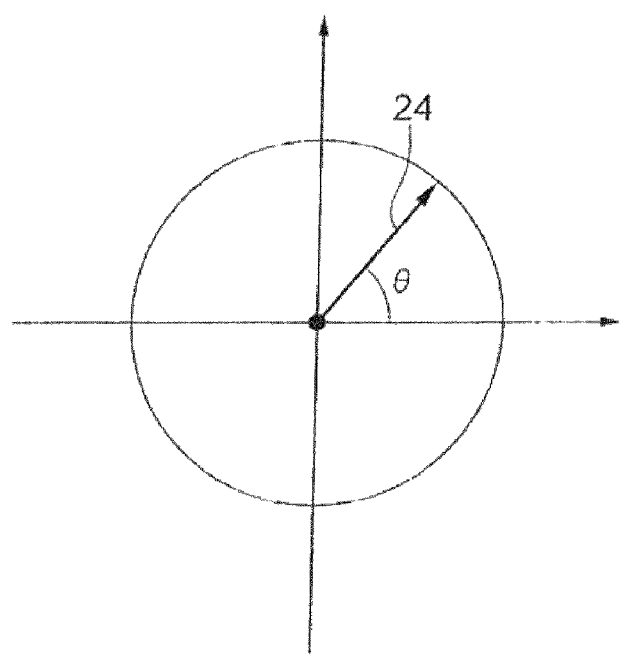
FIG. 15 is a view illustrating the Lissajous figure drawn by the sine wave and cosine wave.

According to this exemplary embodiment, as the magnetic sensor 12 detects a change in the direction of the magnetic field of the rod 1, there is almost no change in sine wave and cosine wave output from the magnetic sensor 12 even if the mounting position of the magnetic sensor 12 is shifted from (1) to (2), as illustrated in FIG. 14. As illustrated in FIG. 15, the Lissajous figure drawn by the sine wave and cosine wave hardly changes in circle size. Hence, it becomes possible to detect the direction θ of the magnetic vector 24 accurately. As the accurate position of the rod 1 can be detected even if the gap 1 between the magnetic sensor 12 and the rod 1 is not controlled with high accuracy, it becomes possible to facilitate mounting adjustment of the magnetic sensor 12. Besides, it is possible to give back-lash to the rod 1 guided by the bush 8 and to allow some bending of the rod 1.

Figure 16:
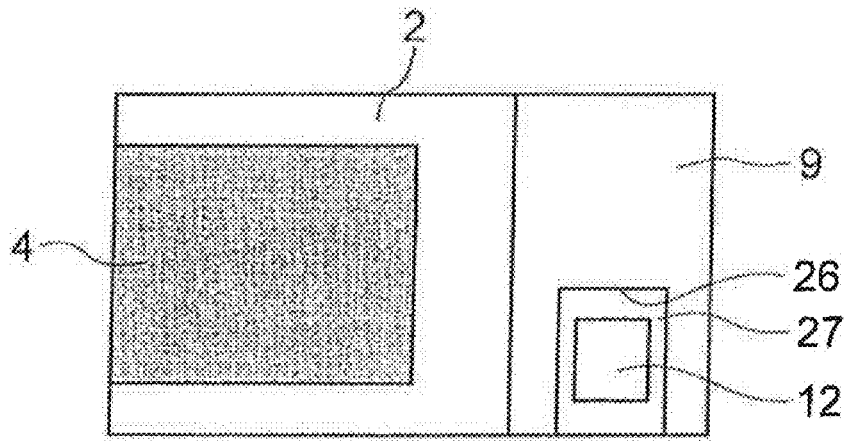
FIG. 16 is a side view illustrating the magnetic sensor mounted in the end case.

FIG. 16 illustrates the magnetic sensor 12 mounted on the end case 9. In the end case 9, a magnetic sensor case 26 is provided having a space for accommodating the magnetic sensor 12. After the magnetic sensor 12 is arranged inside the magnetic sensor case 26, the case is filled with a filler 27 around the magnetic sensor 12. Then, the magnetic sensor 12 is fixed to the end case 9. The magnetic sensor 12 has temperature dependence and its output varies depending on change in temperature. In order to reduce influence of heat from the coils 4, the end case 9 and the filler 27 are made of a material of heat conductivity lower than that of the coil case 2. For example, the coil case 2 is made of epoxy resin and the end case 9 and the filler 27 are made of polyphenylene sulfide (PPS).

Figure 17:
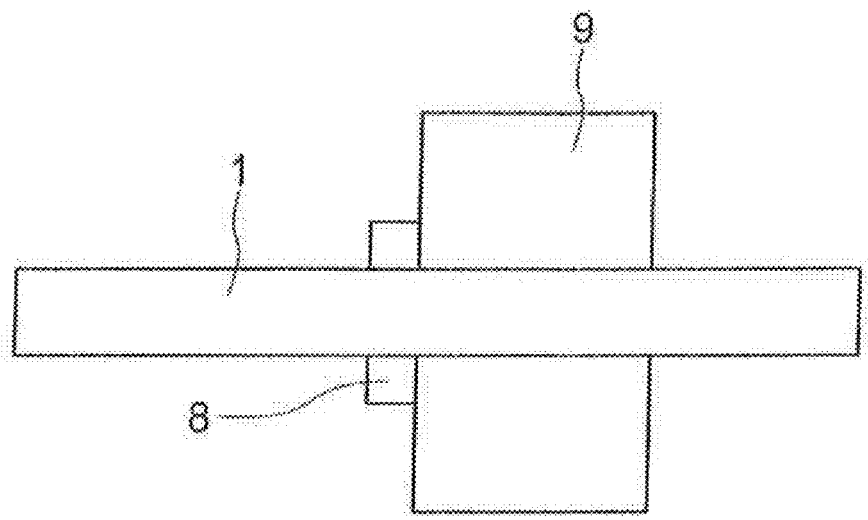
FIG. 17 is a side view illustrating a bush mounted in the end case.

FIG. 17 illustrates the bush 8 as bearing mounted on the end case 9. As it gives the end case 9 a bearing function, it becomes possible to prevent fluctuations of the gap between the rod 1 and the magnetic sensor 12.

Figure 18:
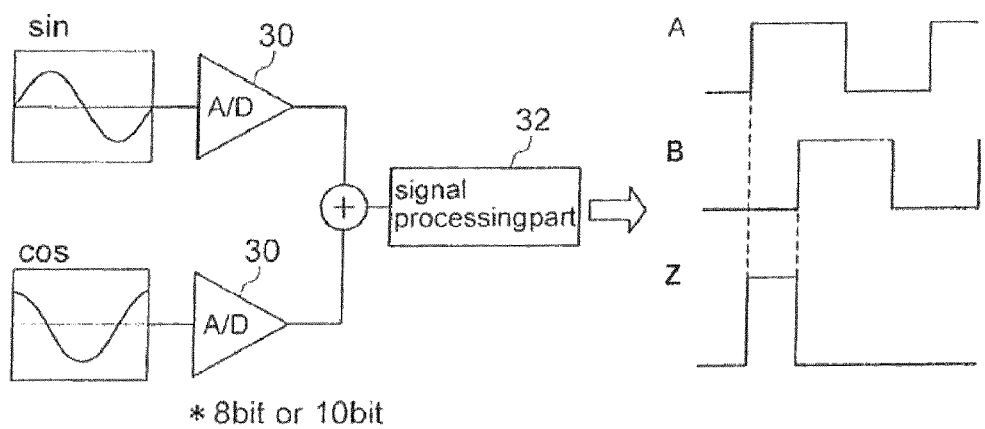
FIG. 18 is a structural view of the position detecting circuit.

FIG. 18 is a structural view of the position detecting circuit 13. The sine wave signal and cosine wave signal output from the magnetic sensor 12 is input to the position detecting circuit 13. The position detecting circuit 13 as an interpolator performs digital interpolation processing on the sine wave signal and cosine wave signal which are 90° phase shifted to each other and outputs phase angle data of high resolution. The pitch between the magnetic poles of the rod 1 is of the order of several ten millimeters and much greater than that of the magnetic encoder which is of the order of several hundred μm. When the rod 1 is also used as a magnetic scale, the sine wave signal and cosine wave signal output from the magnetic sensor 12 need to be segmentized to increase the resolution. Change in the sine wave signal and cosine wave signal output from the magnetic sensor 12 significantly exerts a very large influence on the position detecting circuit of increased resolution. Therefore, it is desired that change in the sine wave signal and cosine wave signal output from the magnetic sensor 12 is small.

The sine wave signal and the cosine wave signal of phases 90° different from each other are input to the A/D converter 30. Te A/D converter 30 samples the sine wave signal and the cosine wave signal at respective intervals to output digital data DA and DB.

Figure 19:
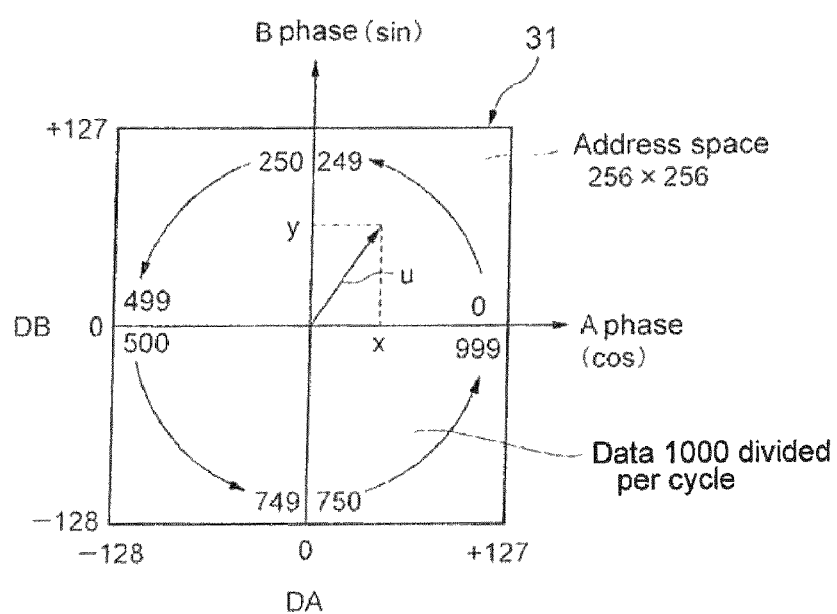
FIG. 19 illustrates a memory configuration of a loop up table memory.

First, as illustrated in FIG. 19, in a look up table memory 31, look up table data is recorded in advance which is created based on the following equation using arctan ($TAN^{-1}$).

$$U = TAN^{-1}(DB/DA)$$

FIG. 19 illustrates a memory configuration of the look up table memory when phase angle data divided by 1000 per cycle is held in an address space of 8 bits×8 bits.

The signal processing part 32 as phase angle data calculating unit searches for digital data DA and DB as x, y addresses, respectively, from the lookup table data and obtains phase angle data u corresponding to the x, y addresses. Then, division and interpolation in one wavelength (area from 0 to $2\pi$) becomes possible. Here, instead of the lookup table memory, calculation of U=$TAN^{-1}$ (DB/DA) may be made to obtain the phase angle data so that division and interpolation in one wavelength (area from 0 to $2\pi$) becomes possible.

Next, the signal processing part 32 as pulse signal generating unit generates an A phase encoder pulse signal and a B phase encoder pulse signal from the phase angle data u and generates a Z phase pulse signal once per cycle. The A phase pulse signal, the B phase pulse signal and the Z phase pulse signal output from the signal processing part 32 are given to the driver 14 of the linear motor 11. The driver 14 uses these position signals as a basis to control the power converter.

Figure 20:
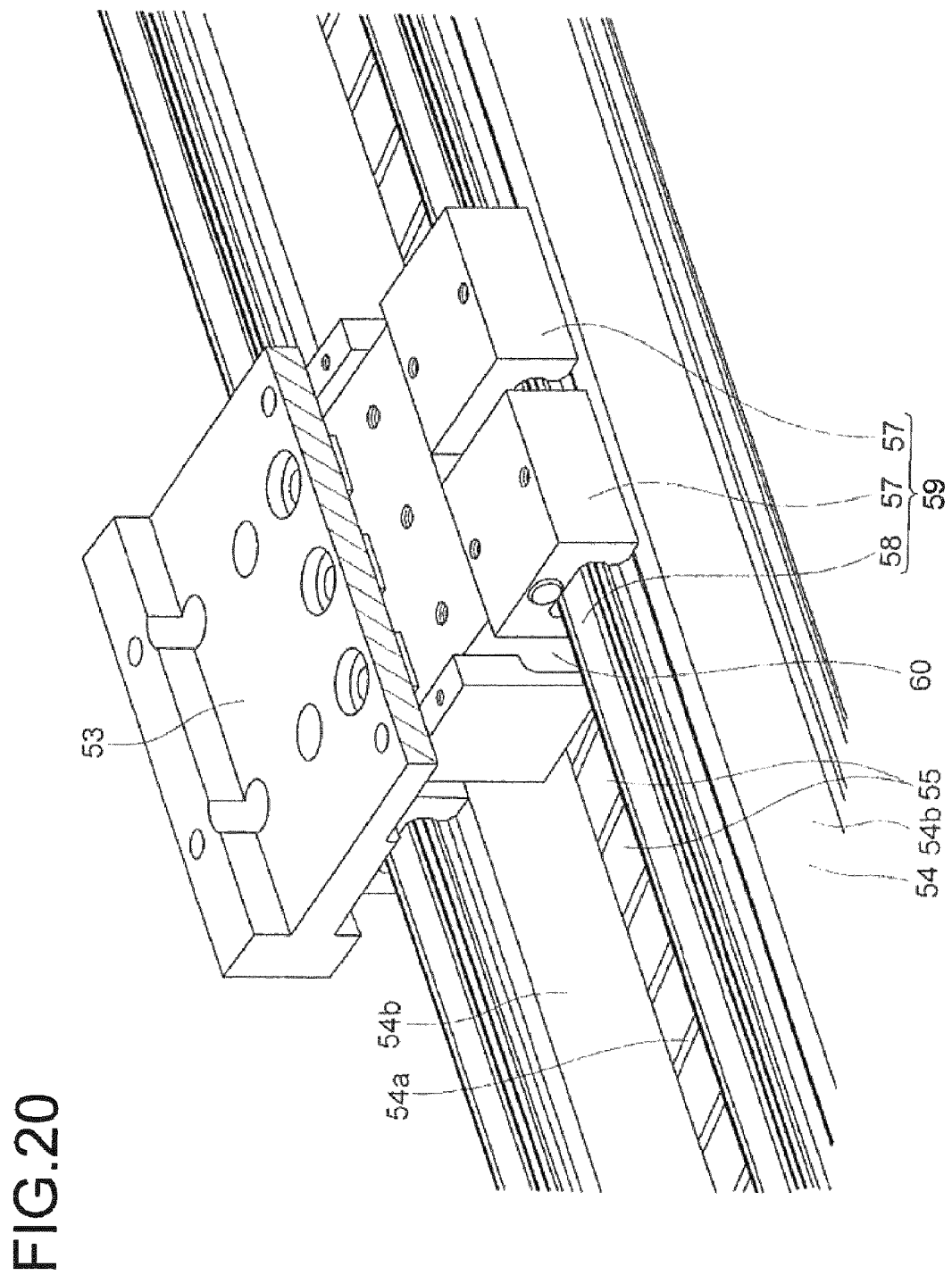
FIG. 20 is a perspective view illustrating another example of the linear motor.
Figure 21:
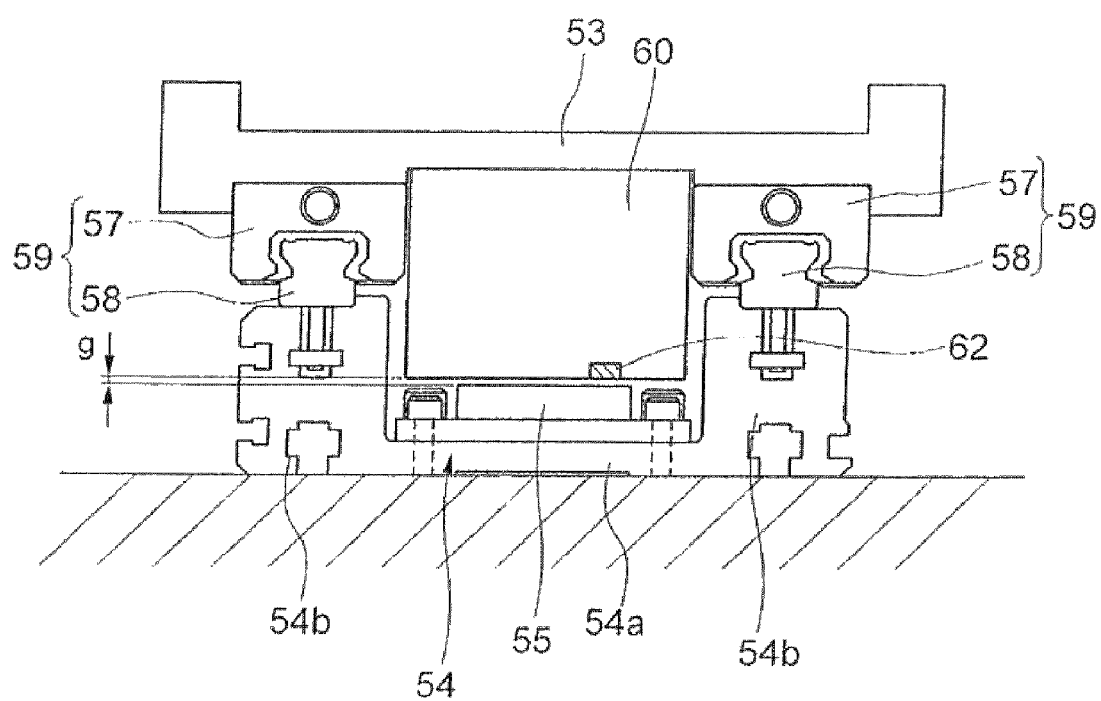
FIG. 21 is a front view of the other example of the linear motor.

FIGS. 20 and 21 illustrate another example of the linear motor. FIG. 20 is a perspective view of the linear motor (including a cross sectional view of the table) and FIG. 21 is a front view. This linear motor is a flat type linear motor having a field magnet composed of plural plate-shaped driving magnets 55 of N poles and S poles created on their surfaces and an armature 60 moving linearly relative to the field magnet. The armature 60 faces the field magnet with a gap g formed therebetween.

On an elongating base 54, the plural plate-shaped driving magnets 55 are arranged in line in the axial direction. These driving magnets 55 serve as a stator of the linear motor. The base 54 has a bottom wall part 54*a* and a pair of side wall parts 54*b* provided at respective width-directional ends thereof. The driving magnets 55 are mounted on the upper surface of the bottom wall part 54*a*.

In each of the driving magnets 55, the N pole and the S pole are created at respective end surfaces in the direction perpendicular to the axial direction (vertical direction in the figure). In order to create the N pole and S pole alternately on the surfaces of the plural driving magnets 55, the driving magnets 55 are arranged in such a manner that magnetic poles of one driving magnet 55 are in reverse of those of an adjacent driving magnet 55.

On the upper surface of each of the side wall parts 54*b* of the base 54, a raceway rail 58 of the linear guide 59 is mounted. A moving block 57 is mounted slidably on the raceway rail 58. Between the raceway rail 58 and the moving block 57, a plurality of balls is arranged rollable therebetween (not shown). In the moving block 57, a circuit-shaped ball circulation passage is provided for circulating the plural balls. When the moving block 57 slides relative to the raceway rail 58, the plural balls roll therebetween and circulate in the ball circulation passage. With this circulation of the balls, the moving block 57 can linearly move smoothly.

On the upper surface of the moving block 57 of the linear guide 59, a table 53 is mounted. The table 53 is made of a nonmagnetic material such as aluminum. Mounted on the table 53 is an object to move. On the lower surface of the table 53, the armature 60 is suspended as mover of the linear motor. As illustrated in the front view of FIG. 21, there is created a gap g between the armature 60 and the driving magnets 55. The linear guide 59 keeps this gap constant even when the armature 60 moves relative to the driving magnets 55.

Figure 22:
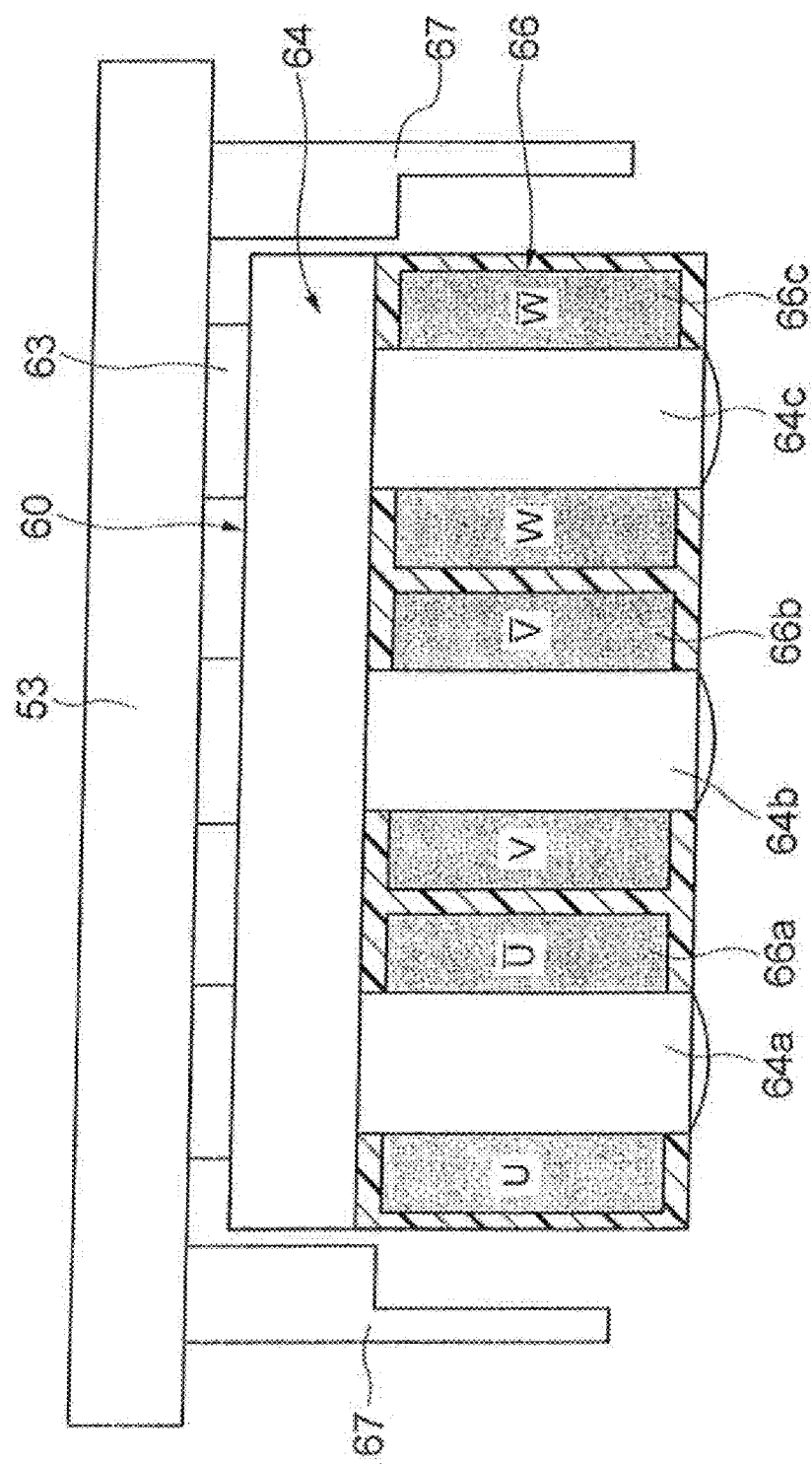
FIG. 22 is a cross sectional view taken along the moving direction of an armature.

FIG. 22 is a cross sectional view taken along the moving direction of the armature 60. On the lower surface of the table 53, the armature 60 is mounted via an insulating material 63. The armature 60 has a core 64 made of magnetic material such as silicon steel and three-phase coils 66*a*, 66*b* and 66*c* wound around salient poles 64*a*, 64*b* and 64*c*, respectively, of the core 64. Three phase current having 120° phase difference are supplied to the three-phase coils 66*a*, 66*b* and 66*c*. After the three-phase coils 66 are wound around the salient poles 64*a*, 64*b* and 64*c*, the three-phase coils 66 are sealed with resin.

On the lower surface of the table 53, a pair of auxiliary cores 67 is mounted sandwiching the armature 60. The auxiliary cores 67 are provided to reduce cogging occurring in the linear motor.

As illustrated in FIG. 21, the armature 60 is provided with a magnetic sensor 63 having a magneto-resistive element 22. The magnetic sensor 62 detects the direction of a magnetic field of the plural driving magnets 55 as stator while moving together with the armature 60.

Figure 23A:
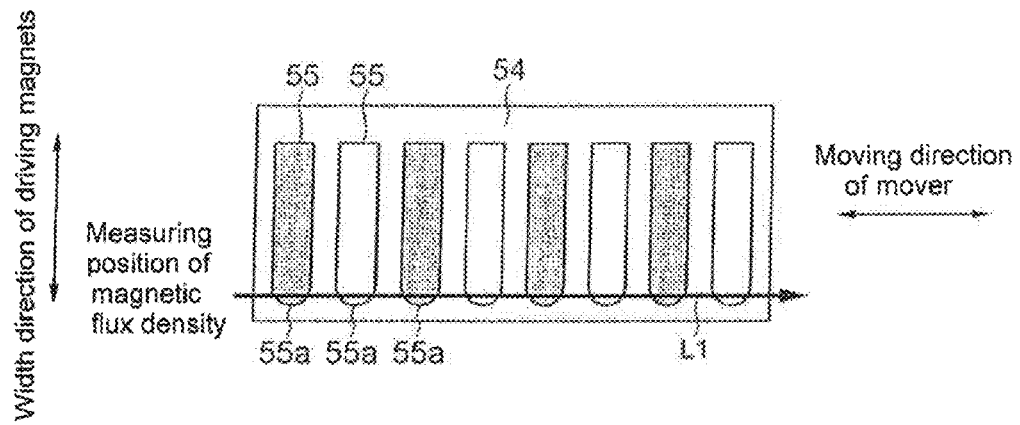
FIGS. 23A and 23B are plane views of driving magnets (FIG. 23A being a plane view of plural driving magnets and FIG. 23B being a plane view of each driving magnet).
Figure 23B:
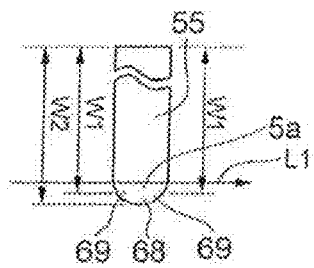

Next description is made about distribution of the magnitude of a magnetic field created by the driving magnets 55 and the shape of the driving magnets 55 as stator. FIG. 23A is a plane view of the plural driving magnets 55 and FIG. 23B is a plane view of a width-directional end part of each driving magnet 55. In this exemplary embodiment, the end part 55*a* of the driving magnet 55 which is apart L1 where the magnetic sensor 62 passes (more specifically, the end part 55*a* below the part L1 where the magnetic sensor 62 passes) is formed in a circular arc shape. As the end part 55*a* is circular-arc shaped, the width W2 of a center part 68 in the moving direction of the armature 60 is greater than the width W1 of each end part 69.

Figure 24:
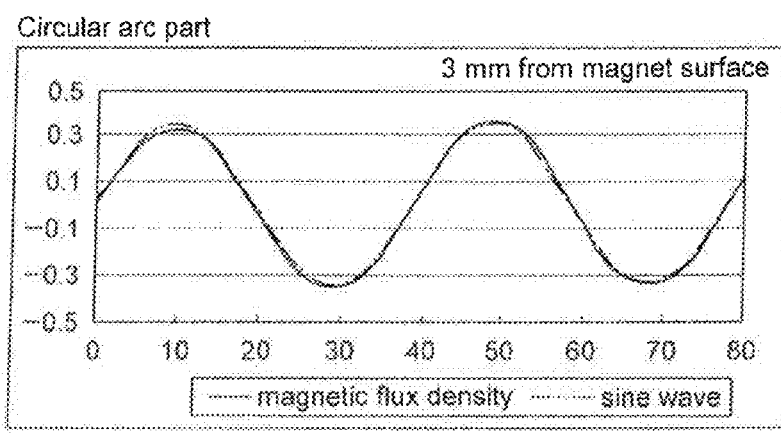
FIG. 24 is a graph for comparing the sine wave and the magnetic field magnitude (magnetic flux density) calculated by simulation.

FIG. 24 is a graph comparing the sine wave and the magnetic field magnitude (magnetic flux density) calculated by simulation. The magnetic sensor 62 moves over the position several millimeters above the circular-arc shaped end part 55*a* of the driving magnet 55. FIG. 24 illustrates distribution of the magnitude of magnetic field at the position where the magnetic sensor 62 moves. As the width of the center part 68 of the driving magnet 55 is wider than the width of the end part 69, a peak of the magnetic field magnitude can be placed on the center part 68 of the driving magnet 55 and the magnetic field magnitude at the both end parts 69 can be reduced. Hence, the distribution of the magnetic field magnitude obtained by simulation can be made close to the sine wave.

Figure 25:
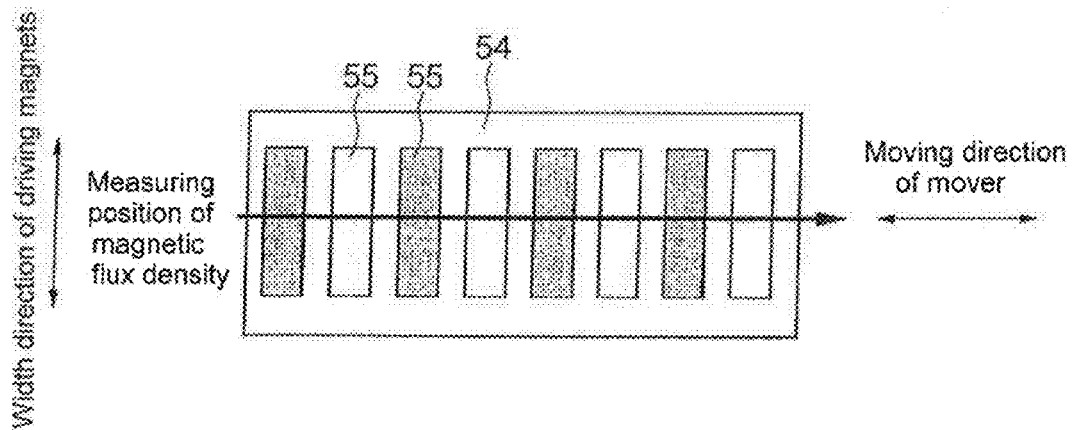
FIG. 25 is a plane view illustrating a comparative example when each driving magnet is rectangular.
Figure 26:
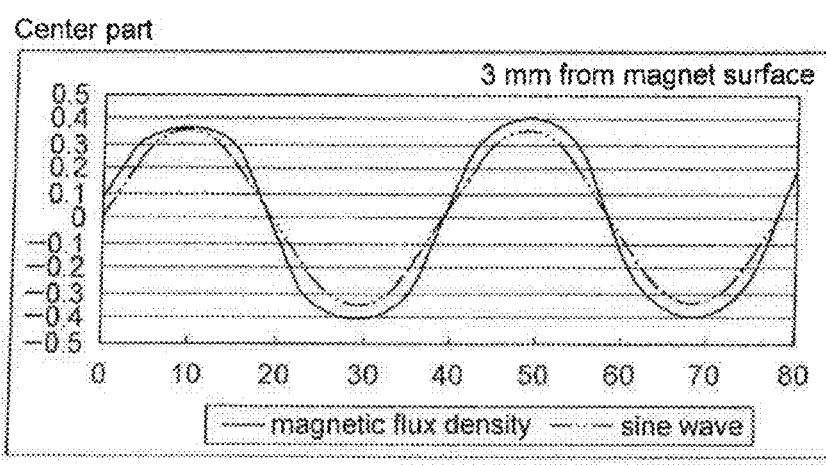
FIG. 26 is a graph illustrating simulation results when each driving magnet is rectangular.

FIG. 25 illustrates a comparative example when each driving magnet 55 is rectangular. FIG. 26 illustrates calculation results of the magnetic field magnitude at the center part of the driving magnet 55 in the width direction. As a result of simulation, when the driving magnet 55 is rectangular, the distribution of the magnetic field magnitude shows expanded profile and is deformed from the ideal sine wave. This seems to be because the magnetic field magnitude at the center part of the driving magnet 55 in the moving direction of the stator becomes close to that at each end part thereof and the peak becomes inconspicuous.

Figure 27:
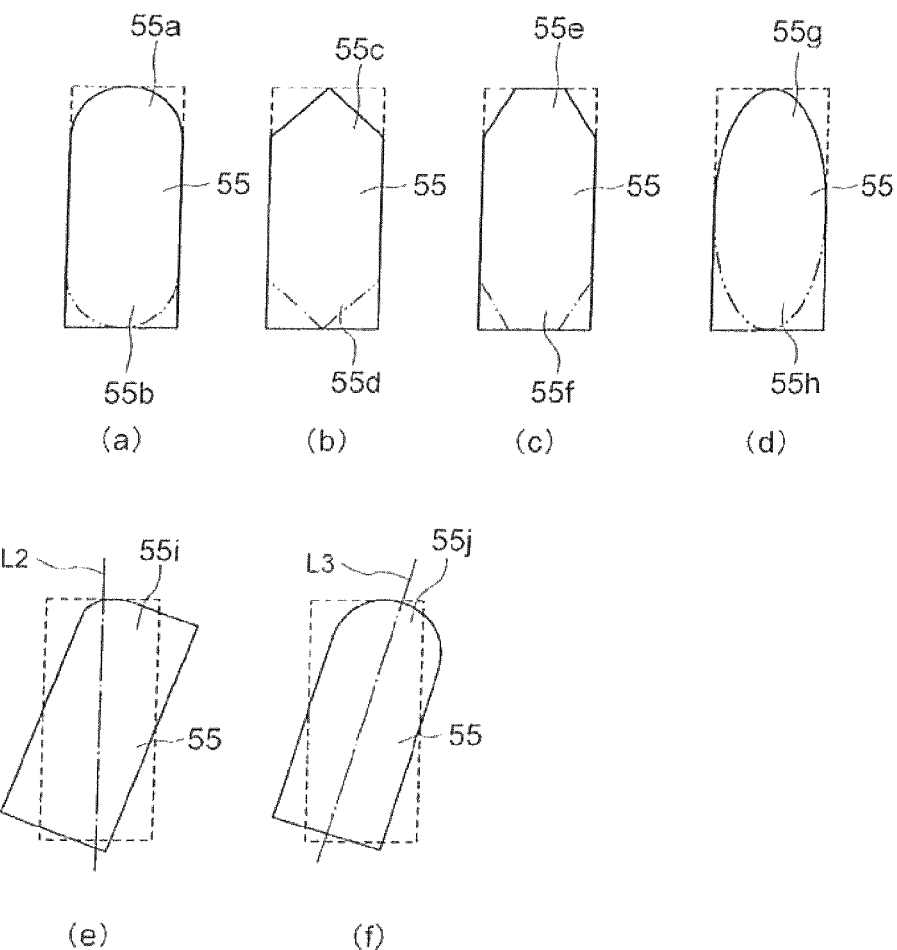
FIGS. 27(a) to 27(f) are plane views illustrating other examples of the driving magnets.

FIGS. 27(*a*) to 27(*f*) illustrate other examples of each driving magnet 55. FIG. 27(*a*) illustrates an example in which the width-directional end part 55*a* of the driving magnet 55 is circular-arc shaped like in the linear motor according to the first exemplary embodiment. The long dashed double-short dashed line of FIG. 27(*a*) shows the example of the both end parts 55*a* and 55*b* of the driving magnet 55 in the width direction which are formed in circular arc shape. With this shape, the distribution of the magnetic field magnitude of the driving magnet 55 can be made close to the sine wave over the entire length of the effective length of the coils. Hence, it is possible to reduce the cogging occurring in the linear motor.

FIG. 27(*b*) illustrates an example in which the width-directional end part 55*c* of the driving magnet 55 is formed in triangle shape and pointed. The long dashed double-short dashed line of FIG. 27(*b*) shows the example of the both end parts 55*c* and 55*d* in the width direction which are formed in triangle shape and pointed in order to reduce the cogging.

FIG. 27(*c*) illustrates an example in which the width-directional end part 55*e* of the driving magnet 55 is formed in trapezoidal shape. The long dashed double-short dashed line of FIG. 27(*c*) shows the example of the both end parts 55*e* and 55*f* in the width direction which are formed in trapezoidal shape and pointed in order to reduce the cogging.

FIG. 27(*d*) illustrates an example in which the width-directional end part 55*g* of the driving magnet 55 is rounded in ellipse shape. The long dashed double-short dashed line of FIG. 27(*d*) shows the example of the both end parts 55*g* and 55*h* in the width direction which are rounded in ellipse shape in order to reduce the cogging.

FIG. 27(*e*) illustrates an example in which the driving magnet 55 is wholly inclined in order to reduce the cogging. The plane shape of the width-directional end part 55*i* of the driving magnet 55 is a circular arc shape and symmetric about the line L2 perpendicular to the moving direction of the mover. As the plane shape of the end part 55*i* is in line symmetry, it becomes possible to make the distribution of the magnetic field magnitude close to the sine wave.

FIG. 27(f) illustrates an example in which the driving magnet 55 is wholly inclined in order to reduce the cogging. In this example, the end part 55j of the driving magnet 55 is formed in circular arc shape and symmetric about the inclined center line L3.

Figure 28:
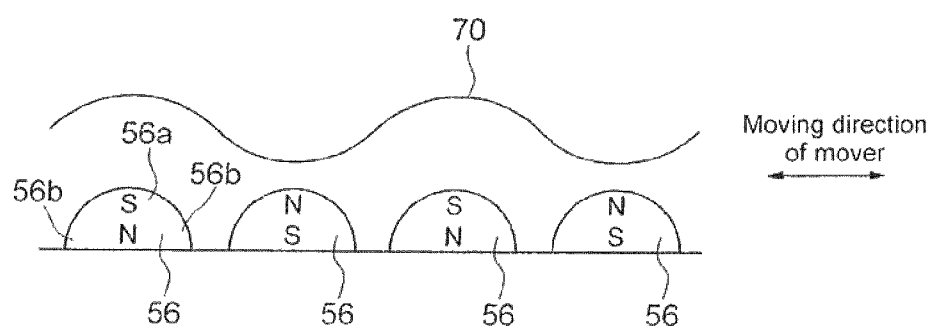
FIG. 28 is a side view illustrating another example of the side surface shape of the driving magnet.

FIG. 28 illustrates yet another example of the driving magnets. For the driving magnets 56 of this example, in the side view, the shape of the part of each driving magnet 56 where the magnetic sensor 62 passes (More accurately, the shape below part where the magnetic sensor 62 passes) is semicircular and the height of the center part 56a in the moving direction of the mover is greater than the height of its end parts 56b. As the height of the center part 56a of the driving magnet 56 is greater and the height of the both end parts 56b is smaller, the peak of the magnetic field magnitude can be placed at the center part 56a of the driving magnet 56 thereby to reduce the magnetic field magnitude at the both end parts 56b. Hence, the distribution 70 of the magnetic field magnitude obtained by simulation can be close to the sine wave.

As each of the driving magnets 56 is formed in semicircular shape of fixed cross section in width direction (direction perpendicular to the paper of FIG. 28), the distribution of the magnetic field magnitude can be close to the sine wave irrespective of the width-directional mounting position of the magnetic sensor 62. Besides, as the distribution of magnetic field generated by whole of the driving magnets 56 is made close to the sine wave, it becomes possible to reduce the cogging.

Figure 29:
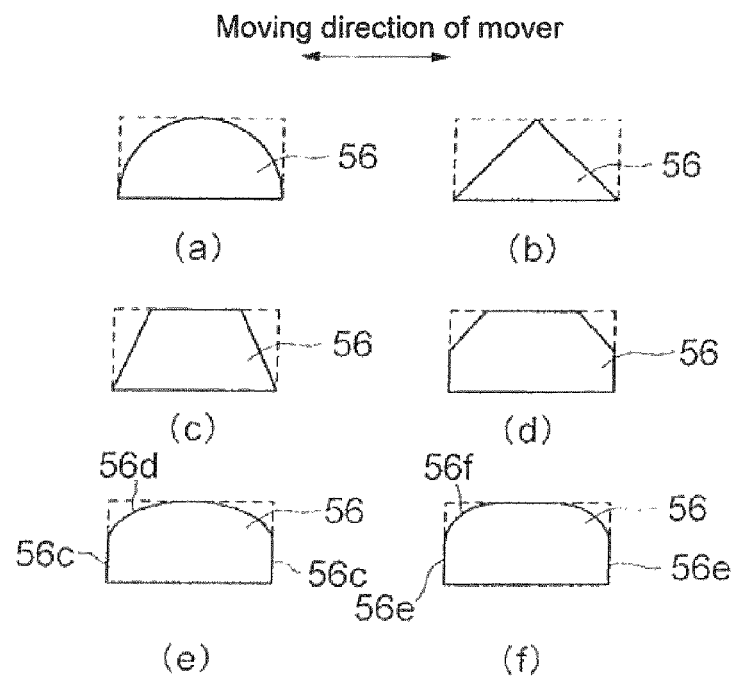
FIGS. 29(a) to 29(f) are side views illustrating other examples of the side surface shape of the driving magnet.

FIGS. 29(a) to 29(f) illustrate yet other examples of the side surface shape of each driving magnet 56. FIG. 29(a) illustrates an example of the side surface of the driving magnet 56 which is formed in semicircular shape like in the example of FIG. 28. FIG. 29(b) illustrates an example of the side surface formed in triangle shape, FIG. 29(c) illustrates an example of the side surface formed in trapezoidal shape, and FIG. 29(d) illustrates an example of the side surface formed in hexagon shape. FIG. 29(e) illustrates an example in which each side wall 56c of the driving magnet 56 is formed into straight line and the upper part 56d is formed in circular arc shape. FIG. 29(f) illustrates an example in which each side wall 56e of the driving magnet 56 is formed into straight line and the upper part 56f is formed of combination of a circular arc and straight lines. In all of these examples, the height of the center part of the driving magnet 56 in the moving direction of the mover is set to be greater than the height of its both end parts thereof.

Figure 30:
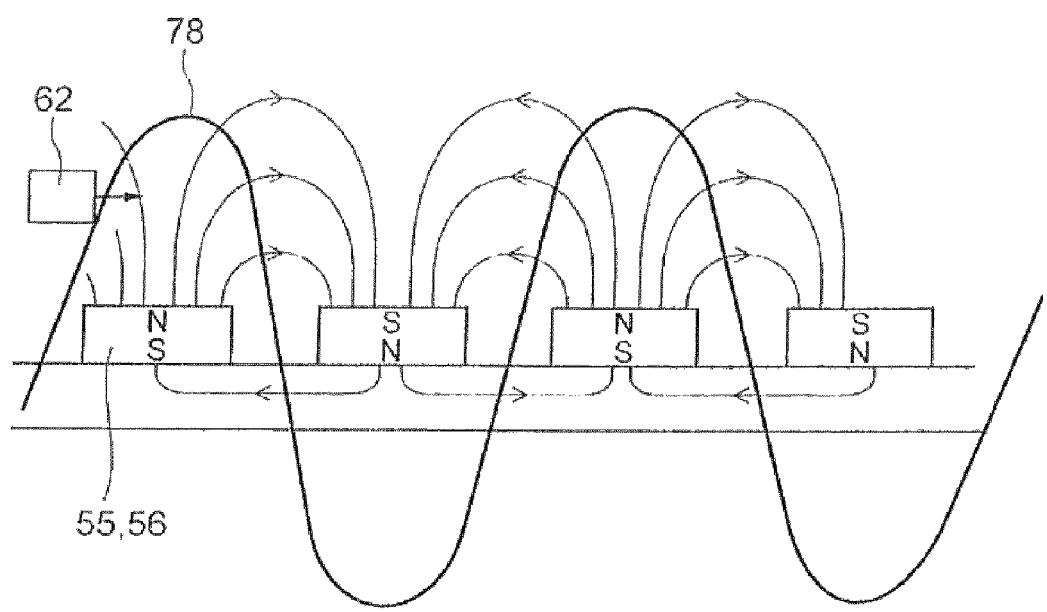
FIG. 30 is a side view illustrating the magnetic sensor passing above the driving magnets.

As illustrated in FIG. 30, the magnetic sensor 62 moves on an upper part of the driving magnets 55, 56 where the distribution 78 of the magnetic flux density is formed into sine wave. The driving magnets 55 and 56 are arranged only under the magnetic sensor 62. The magnetic force lines generated in the driving magnets 55 and 56 are carried in air to adjacent driving magnets 55 and 56.

As the magnetic sensor 62 is more and more away from the driving magnets 55 and 56, the distribution of the magnetic flux density at the part where the magnetic sensor 62 passes can be made close to the sine wave. However, the wasted space becomes larger. As the plane shape of each driving magnet 55 at the part where the magnetic sensor 62 passes is formed in circular arch shape or the side surface shape of the part of each driving magnet 56 at the part where the magnetic sensor 62 passes is semicircular, the distribution of the magnetic flux density at the part where the magnetic sensor 62 passes can be made close to the sine wave even without getting the magnetic sensor 62 much away from the driving magnets 55 and 56. In addition, when the side surface of each driving magnet 56 is formed in semicircular shape, the magnetic flux density of the driving magnets 56 becomes somewhat small. When the plane shape of each driving magnet 55 is circular arc, the magnetic flux density can be prevented from being smaller and the thrust of the linear motor can be made larger.

Figure 31:
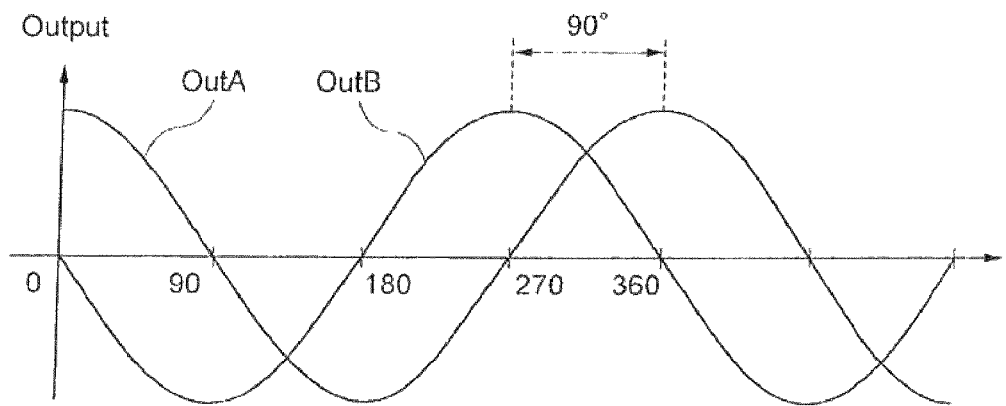
FIG. 31 is a view illustrating a voltage signal output from the magnetic sensor.
Figure 32:
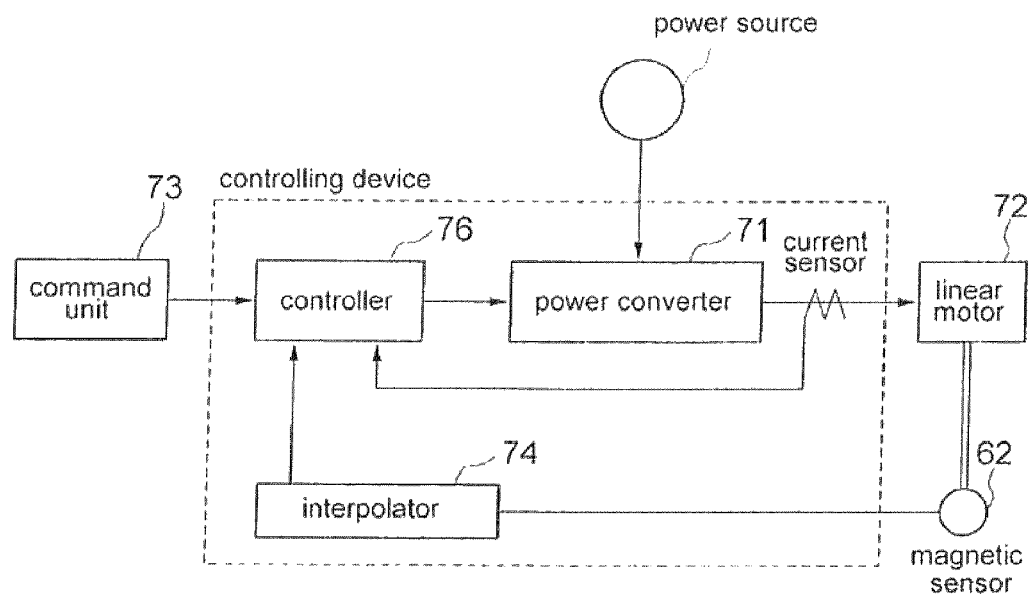
FIG. 32 is a structural view of a controlling device of the linear motor.
Figure 33:
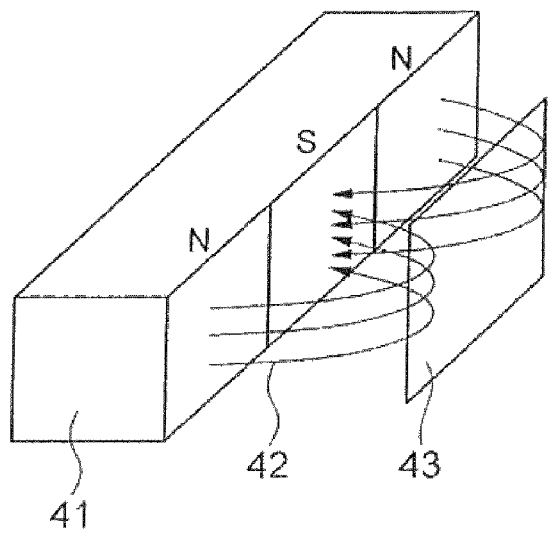
FIG. 33 is a conceptual diagram illustrating a conventional encoder.
Figure 34:
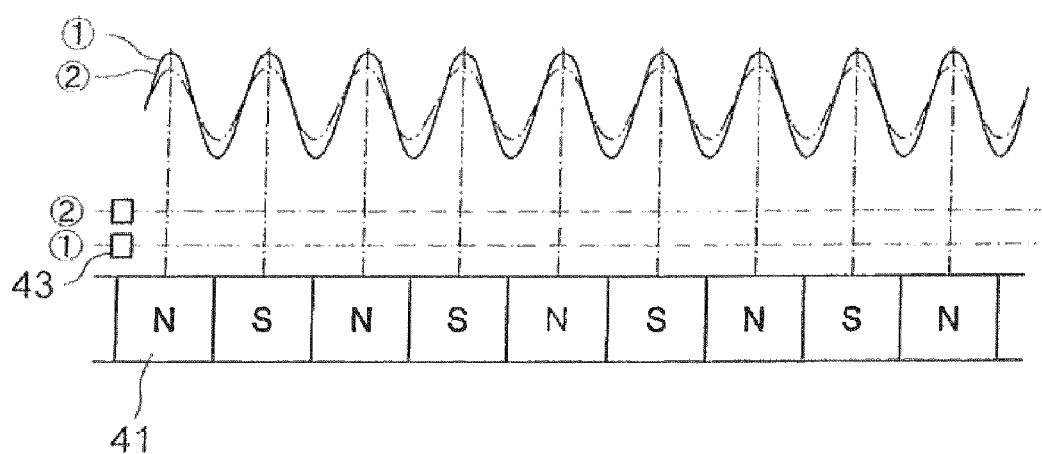
FIG. 34 is a conceptual diagram illustrating an output signal of the magnetic sensor and the positional relation between the magnetic scale and the magnetic sensor of the conventional encoder.
Figure 35:
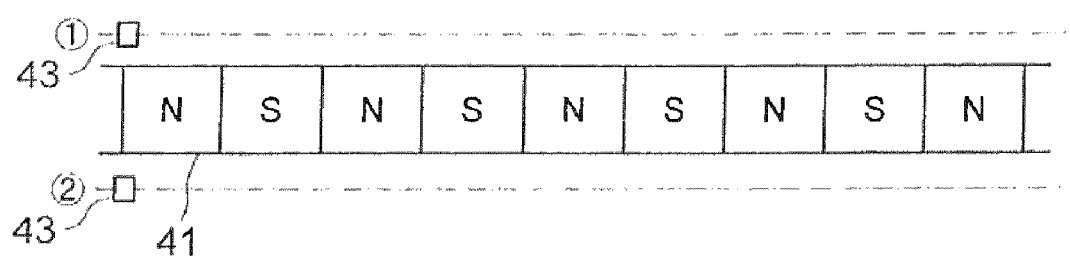
FIG. 35 is a view illustrating the magnetic sensors arranged at respective sides of the magnetic scale.

The magnetic sensor detects the direction of a magnetic field of the driving magnets 55, 56. Then, as illustrated in FIG. 31, the magnetic sensor 63 outputs voltage signals of sine wave and cosine wave which are 90° phase shifted from each other. As illustrated in FIG. 32, the voltage signals output from the magnetic sensor 62 are given to an interpolator 74 as position signal generating unit. The interpolator 74 uses the voltage signals of sine wave and cosine wave as a basis to calculate the position of the armature 60 as mover. The positional information calculated by the interpolator 74 is output to a controller 76. The circuitry of the interpolator 74 is the same as that of the position detecting circuit 13 as illustrated in FIG. 18. The controller 76 controls a power converter 71 such as PWM (Pulse Width Modulation) inverter in such a manner that the mover moves in accordance with positional instructions from an upper-level command unit 73 and finally controls current to be supplied to the armature 60 of the linear motor 72. The control system of the controller 76 is a position control loop for controlling the position, a speed control loop for controlling the speed and a current control loop for controlling the current.

The present invention is not limited to the above-described embodiments and may be embodied in various forms without departing from the scope of the present invention.

For example, in the above-described embodiment, the rod moves linearly relative to the coils, however, the coils may move linearly relative to the rod.

In addition, in order to prevent shortening of the stroke of the rod, the magnetic sensor may be mounted on the coil case. As the magnetic field of the rod generating the thrust is strong, it is possible to detect the direction of the magnetic field of the rod without affection of the magnetic field generated by the coils.

The present application is based on Japanese Patent Application No. 2007-145641 filed on May 31, 2007, and their contents are incorporated by reference herein.

The invention claimed is:

1. A linear motor position detection system comprising:
   a linear motor having one of a mover and a stator in which magnetic poles of N pole and S pole are arranged alternately in an axial direction and an other of the mover and the stator including a plurality of coils and provided for obtaining thrust for linear movement by a magnetic field generated by one of the mover and stator and current passing through the coils of the other of the mover and stator;
   a magnetic sensor having a magneto-resistive element of which a resistance varies depending on a direction of the magnetic field and provided for outputting a sine wave signal and a cosine wave signal which are 90° phase shifted to each other, depending on change in direction of the magnetic field generated by the linear movement of the mover relative to the stator; and
   a position detecting circuit for detecting a position of the mover relative to the stator based on the sine wave signal and the cosine wave signal,
   wherein the magnets sensor is disposed at a position where a magnetic field magnitude, greater than that in a saturation sensitivity range, is applied, the saturation sensitivity range being such that resistance change of the magneto-resistive element is saturated.

2. The linear motor position detection system according to claim 1, wherein the position detecting circuit comprises an A/D converter for sampling the sine wave signal and the cosine wave signal at predetermined intervals to convert them into digital data, a phase angle data calculating unit for obtaining phase angle data from a sine component and a cosine component of the digital data converted, and a pulse signal outputting unit for generating a pulse signal in accordance with the phase angle data.

3. The linear motor position detection system according to claim 1 or 2, wherein the linear motor is a rod type linear motor, having: in the one of the mover and the stator, a rod having a plurality of magnets each magnetized with the N pole and the S pole at respective ends thereof in the axial direction, the magnets being arranged in the axial direction in such a manner that the N pole of each magnet faces the N pole of an adjacent magnet and the S pole of each magnet faces the S pole of an adjacent magnet and a soft magnetic material being interposed between adjacent ones of the magnets; and in the other of the mover and the stator, the plural coils surrounding the rod.

4. The linear motor position detection system according to claim 3, wherein the linear motor further has a coil case for accommodating the plural coils, a magnetic sensor case provided at an end of the coil case in the axial direction and having a magnetic sensor accommodating part for accommodating the magnetic sensor, and a filler for filling the magnetic sensor accommodating part to fix the magnetic sensor to the magnetic sensor accommodating part, and at least one of the magnetic sensor case and the filler has a heat conductivity lower than that of the coil case.

5. The linear motor position detection system according to claim 4, wherein the linear motor further has a bearing mounted at an end of the magnetic sensor case in the axial direction for guiding linear movement of the rod.

6. The linear motor position detection system according to claim 1 or 2, wherein the linear motor is a flat type linear motor, having: in the one of the mover and the stator, a field magnet having a plurality of magnets each magnetized with the N pole and the S pole at respective end surfaces thereof in a direction perpendicular to the axial direction; and, in the other of the mover and the stator, the plural coils facing the field magnet with a gap formed therebetween.

* * * * *